Figure 1:
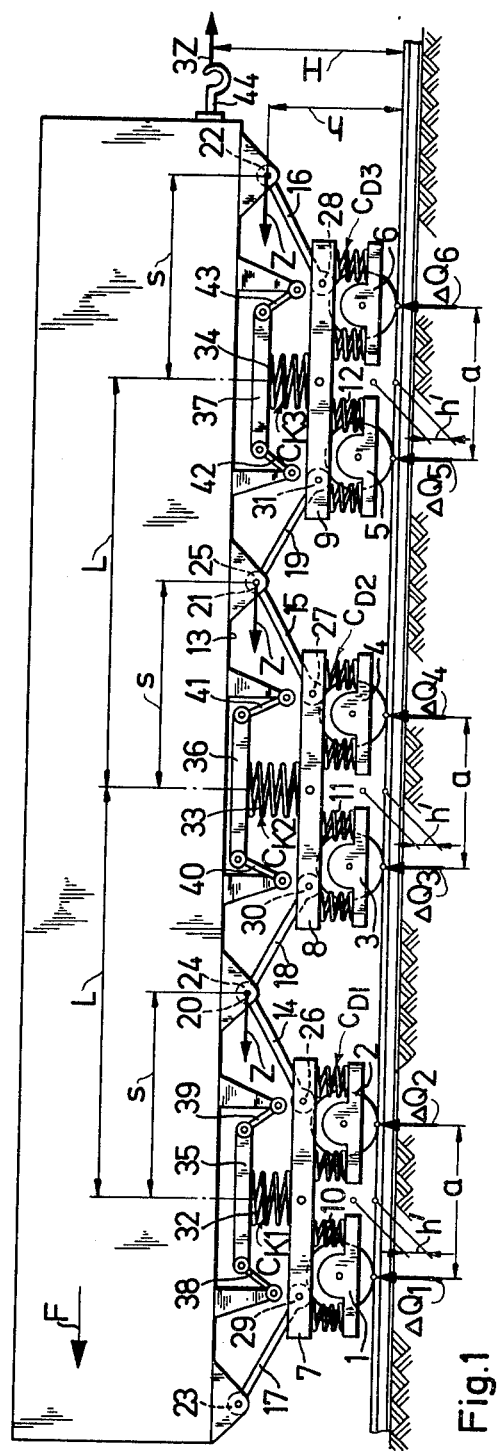

United States Patent [19]

Fromm

[11] 3,908,559

[45] Sept. 30, 1975

[54] RAIL TRACTION VEHICLE SUSPENSION SYSTEM

[75] Inventor: Erich Fromm, Winterthur, Switzerland

[73] Assignee: Sulzer Brothers Limited, Winterthur, Switzerland

[22] Filed: Oct. 26, 1972

[21] Appl. No.: 301,087

[30] Foreign Application Priority Data
Oct. 28, 1971 Switzerland.................. 15698/71

[52] U.S. Cl........... 105/453; 105/157 R; 105/182 R; 105/184; 267/3; 280/124 A
[51] Int. Cl.²..... B61F 1/14; B61F 3/06; B61F 5/06; B61F 5/50
[58] Field of Search.... 105/157 R, 164, 453, 197 B, 105/182 R, 184; 267/65 A, 3; 280/124 A

[56] References Cited
UNITED STATES PATENTS
1,623,516  4/1927  Zoelly.......................... 105/453 X

| | | |
|---|---|---|
| 2,384,925 | 9/1945 | Janeway............................ 105/453 |
| 2,636,451 | 4/1953 | Watter........................ 105/197 B X |
| 2,773,686 | 12/1956 | Nash................................. 267/65 A |
| 3,691,692 | 9/1972 | Mouneydiere...................... 105/453 |
| 3,734,030 | 5/1973 | Kreissig et al. ..................... 105/164 |

*Primary Examiner*—M. Henson Wood, Jr.
*Assistant Examiner*—Howard Beltran
*Attorney, Agent, or Firm*—Kenyon & Kenyon Reilly Carr & Chapin

[57] ABSTRACT

The rail vehicle which is supported on three bogies is provided with spring suspension systems for each bogie. A primary suspension system supports each bogie on at least a pair of drive axles and secondary suspension systems support the vehicle chassis on the bogies. The combined spring constant of the suspension systems for the middle bogie is made softer, or less than, the combined spring constants for the outer bogies to equalize the load relief on the two forward bogies during travel.

6 Claims, 2 Drawing Figures

RAIL TRACTION VEHICLE SUSPENSION SYSTEM

This invention relates to a rail traction vehicle. More particularly, this invention relates to a rail traction vehicle having means for compensating the loading of the driving axles.

Heretofore, rail traction vehicles have been known which are supported on at least three bogies, each of which has at least two driving axles, by various types of resilient suspension systems. In many instances, when a tractive effort has been applied by these vehicles to a track, particularly where the chassis of the vehicle is undivided longitudinally and is provided with a statically undefined support and a draw hook, an irregular distribution of the axle pressures occurs depending on the geometrical dimensions and the spring characteristics of the vehicle. The load of the leading axles is more or less relieved by the rotation moment caused by the height of the hook above the rails.

In order to enable such a vehicle to achieve a maximum tractive effort, attempts have been made to equalize the load relief of a substantial number of leading driving axles, for example the axles of the leading and middle bogie in a vehicle with three bogies. For example, different beam constructions or intermediate chassis have been used to distribute the load on the axles. Those constructions, however, have been expensive and represent an additional weight which cannot always be tolerated. Variable springing means, for example pneumatic or hydraulic springs, have also been used to achieve a maximum tractive effort. However, these require regulating elements as well as their own energy source since the control process consumes energy. As a result, they have also been expensive to operate.

Accordingly, it is an object of the invention to provide a three bogie rail traction vehicle which permits uniform load-relief of the leading axles of the leading and middle bogie while avoiding the use of beam structures, intermediate chassis or variable springing means.

It is another object of the invention to provide a rail traction vehicle with a springing means having invariable spring characteristics which require no regulation, are simple in operation, inexpensive to purchase and require no additional energy.

It is another object of the invention to have a rail traction vehicle apply the same full tractive effort in both travelling directions.

It is another object of the invention to be able to interchange the bogies of a three-bogie rail traction vehicle.

Briefly, the invention provides a rail traction vehicle having a vehicle chassis which is mounted by three bogies, each of which is connected to at least two driving axles, on a rail with primary spring suspension means between the drive axles and the respective bogies and with secondary spring suspension means between each bogie and the vehicle chassis. The vehicle also has a means connected to the bogies and the vehicle chassis for compensating the loading of the driving axles.

In order to equalize the load relief on the axles of the two forward bogies relative to the direction of travel during application of a tractive effort, the suspension means are constructed with various spring constants in which the primary spring suspension means and the secondary spring suspension means of the middle bogie have a combined spring constant different from the combined spring constants of the primary and secondary suspension means of the outer bogies.

The means for compensating the loadings of the driving axles may preferably comprise known deep-drawing devices such as a tie bar means. The use of other devices to this end is, however, also feasible.

The primary suspensions for all the bogies can be constructed in an identical manner with the same spring constant with only the spring constant of the secondary suspension of the middle bogie deviating from the spring constants of the secondary suspensions of the outer bogies. This construction enables all the bogies and the primary suspensions to be interchanged, a feature which is important for the maintenance of the vehicle.

Since a secondary suspension means with a very soft spring characteristic is normally obtained for the middle bogie, it is advantageous in many cases if the secondary suspension means of the middle bogie employs a gas spring having a constant enclosed gas weight. Such a gas spring may be provided with a vessel connected to a bellows of the spring which is adapted to increase the effective volume of the gas spring. Such a vessel may be disposed at any desired position of the traction vehicle.

Figure 2:
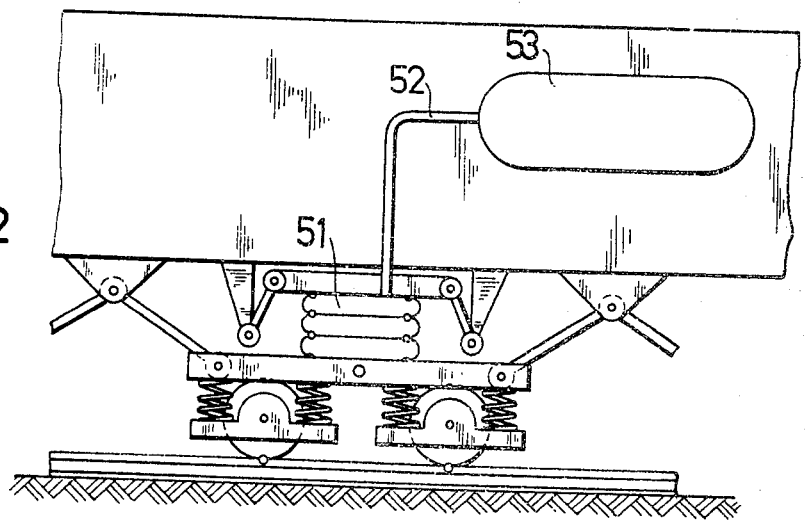

These and other objects and advantages of the invention will become more apparent from the following detailed description and appended claims taken in conjunction with the accompanying drawings in which:

FIG. 1 diagrammatically illustrates a side view of a locomotive constructed in accordance with the invention with the dimensions and forces for calculating the suspension means being plotted; and FIG. 2 illustrates a fragmentary sectional view of a gas spring which can be used as a secondary suspension means for the middle bogie in accordance with the invention.

Referring to FIG. 1, a rail traction vehicle, i.e. a locomotive, contains driving axles 1, 2, 3, 4, 5, 6 which are associated with electric motors (not shown) for driving the axles 1–6 on a rail. Three bogie chassis 7, 8, 9 are, as shown, supported on the driving axles 1–6 by means of primary suspension systems 10, 11 and 12 having spring compression stiffness constants $C_{D1}$, $C_{D2}$, $C_{D3}$. In addition, in order to compensate the loading of the driving axles, means in the form of underslung tie means with tie rods 14, 15, 16 are provided for transmitting a tractive effort from the bogie chasses 7, 8, 9 to the locomotive chassis 13 for the travelling direction represented by the arrow F while tie rods 17, 18, 19 are provided for the opposite travelling direction. The respective tie rods 14–19 are resiliently mounted on the locomotive chassis 13 in respective joints 20, 21, 22 and 23, 24, 25 and are joined to the bogies 7, 8, 9 by means of respective joints 26, 27, 28 and 29, 30, 31. The horizontal distance $s$ between the joints 20–25 and the vertical axes of the bogies 7–9 and the height $h$ of the joints 20-25 above the rail are selected so that the extended axes of the tie rods connected to each bogie intersect with the vertical axes of the bogie centers at a distance $h'$ above the top edge of the rail. It is preferable if the distance $h' = 0$.

The locomotive chassis 13 is supported on the bogies 7, 8, 9 by means of secondary suspension systems 32, 33, 34 having spring compression stiffness constants $C_{K1}$, $C_{K2}$, $C_3$, respectively. The springs of these secondary suspension systems 32–34 bear on rockers 35, 36 and 37 by means of radius arms 38, 39, 40, 41, 42 and 43 as shown. A hook 44 for transmitting a tractive effort of 3Z, if Z represents the tractive effort of a bogie, is mounted on the locomotive chassis 13 at a vertical distance H above the top edge of the rail.

The spring stiffnes constants $C_{D1}$, $C_{D2}$ and $C_{D3}$ of the primary suspension systems 10–12 and the spring stiffness constants $C_{K1}$, $C_{K2}$ and $C_{K3}$ of the secondary suspension systems 32–34 in conjunction with the center distances L of the bogies and the dimensions already described above are adapted so as to equalize the load relief of the axles 1 to 4 which lead in the locomotive travelling direction indicated by the arrow F ($\Delta Q_1 = \Delta Q_2 = \Delta Q_3 = \Delta Q_4$). The sum of these load reliefs is absorbed by a uniform additional loading of the trailing axles 5 and 6 ($\Delta Q_5 = \Delta Q_6$).

Vehicles which apply the same tractive effort in both travelling directions are subject to the condition that the spring stiffness constant of the suspension systems of the two outer bogies 7 and 9 are identical. Accordingly, $C_{D1} = C_{D3}$ and $C_{K1} = C_{K3}$.

In such a case, it is possible to calculate the spring stiffness constants $C_{D2}$ and $C_{K2}$ in accordance with static equilibrium conditions from the following formula assuming that $h' = 0$:

$$C_{K2} = \frac{2 C_{D1} \cdot C_{D2} \cdot C_{K1} \left[ L - s - \frac{(H-h)}{h} \cdot s \right]}{2L \cdot C_{D1} \cdot C_{D2} + (C_{D1} \cdot C_{D2} + 2 C_{D1} C_{K1} + C_{D2} C_{K1}) \cdot \left[ s + \frac{(H-h)}{h} \cdot s \right]}$$

The spring stiffness constants of the primary suspensions 10–12 of all bogies is preferably made identical in the interests of interchangeability. Thus, in cases where $C_{D1} = C_{D2} = C_{D3}$, the spring constant $C_{K2}$ will be expressed by the following formula:

$$C_{K2} = \frac{2 C_{D1} \cdot C_{K1} \left[ L - s - \frac{(H-h)}{h} \cdot s \right]}{2 C_{D1} \cdot L + (C_{D1} + 3 C_{K1}) \cdot \left[ s + \frac{(H-h)}{h} \cdot s \right]}$$

As shown in FIG. 1, the drive axles are symmetrical about the vertical centerline of each bogie and are spaced apart a distance $a$.

Upon movement of the vehicle and the application of a tractive effort via the hook 44, a rotation moment is imparted to the vehicle to raise the leading end of the vehicle relative to the trailing end. This causes the primary and secondary suspension systems 11, 33 of the middle bogie 8 to elongate a different amount from the primary and secondary suspension systems 10, 32 of the leading bogie 7. However, due to the different spring constants, the load of the vehicle on the axles 3, 4 of the middle bogie 8 is relieved by an amount ($\Delta Q_3 + \Delta Q_4$) equal to the load relief ($\Delta Q_1 + \Delta Q_2$) on the axles 1, 2 of the leading bogie 7.

It is normally possible to construct all springs of the primary as well as of the secondary suspension systems of steel. However, if very small spring constants are required, the middle suspension system 33 can alternatively be constructed with a secondary suspension system as shown in FIG. 2. In this case, the secondary suspension system is in the form of a gas spring having a spring bellows 51 connected by means of a duct 52 in seal-tight manner to a gas vessel 53. The bellows 51 together with the duct 52 and the vessel 53 represent a gas spring suspension system with a large gas volume and, therefore, a small spring constant. It is not necessary for the gas spring to be regulated as the spring contains a precisely dimensioned and constant amount of gas, more accurately a constant gas weight. The gas spring further merely requires the replacement of an amount of gas which may have escaped due to possible leakages.

It will be understood that the secondary suspension systems illustrated in FIGS. 1 and 2 may contain more than one spring. For example, steel springs are normally disposed in sets of two or four, each half being disposed on one side of the locomotive. As regards the gas spring illustrated in FIG. 2, it is also possible to provide two different suspension systems with bellows and vessel on each side of the locomotive. It is also possible to provide two bellows which communicate with each other or only one bellows which is disposed in the middle of the bogie. In such a case, the suspension system may be provided with a rocking support, for example in the manner of a known torsion bar.

What is claimed is:

1. A rail traction vehicle comprising three bogies; at least two driving axles connected to each respective bogie for applying a tractive effort to a rail; a plurality of primary spring suspension means each supporting a respective one of said bogies on said driving axles connected thereto; a vehicle chassis; a plurality of secondary spring suspension means, each supporting said vehicle chassis on a respective bogie; and means connected to said bogies and said vehicle chassis for compensating the loading of said driving axles; said primary spring suspension means of the outer bogies of said three bogies having equal spring constants and said secondary spring suspension means of said outer bogies having equal spring constants; said primary spring suspension means and said secondary spring suspension means of the middle bogie of said bogies having a combined spring constant different from the combined spring constants of said respective primary and secondary suspension means of said outer bogies whereby upon movement of the vehicle in a direction of travel and the application of a tractive effort, said primary and secondary suspenion means of said middle bogie elongate a different amount from said primary and secondary suspension means of the leading bogie to relieve the load of said vehicle on said axles of said middle bogie an amount equal to the load relief on said axles of said leading bogie.

2. A rail traction vehicle as set forth in claim 1 wherein said compensating means is an underslung tie rod means.

3. A rail traction vehicle as set forth in claim 1 wherein said primary suspension systems of said three bogies have identical spring constants and said spring constant of said secondary suspension means of said middle bogie differs from said spring constants of said secondary suspension means of said outer bogies.

4. A rail traction vehicle as set forth in claim 1 wherein said secondary suspension means of said middle bogie contains a gas spring having a constant enclosed gas weight.

5. A rail traction vehicle as set forth in claim 4 wherein said gas spring comprises a bellows, a supplementary gas volume, and a duct communicating with said supplementary gas volume with said bellows.

6. A rail traction vehicle as set forth in claim 1 wherein said combined spring constant of said middle bogie is less than said combined spring constants of said outer bogies.

* * * * *